United States Patent
Kato et al.

(10) Patent No.: US 11,860,716 B2
(45) Date of Patent: Jan. 2, 2024

(54) INFORMATION PROCESSING APPARATUS, INFORMATION PROCESSING METHOD, AND STORAGE MEDIUM

(71) Applicant: KABUSHIKI KAISHA TOSHIBA, Tokyo (JP)

(72) Inventors: Yuichi Kato, Kawasaki (JP); Kentaro Takagi, Yokohama (JP); Kouta Nakata, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/651,915

(22) Filed: Feb. 22, 2022

(65) Prior Publication Data

US 2022/0398146 A1     Dec. 15, 2022

(30) Foreign Application Priority Data

Jun. 9, 2021   (JP) .................. 2021-096667

(51) Int. Cl.
    *G06F 11/07*    (2006.01)
(52) U.S. Cl.
    CPC ...... *G06F 11/0769* (2013.01); *G06F 11/0709* (2013.01); *G06F 11/0751* (2013.01)
(58) Field of Classification Search
    CPC ............ G06F 11/0709; G06F 11/0751; G06F 11/0769

USPC ....................... 714/4.1, 37, 48, 57
See application file for complete search history.

(56) References Cited

U.S. PATENT DOCUMENTS

2021/0398259 A1\* 12/2021 Yamazoe ............... G06T 5/002
2022/0175325 A1\* 6/2022 Fukushima ........... G16H 50/30

FOREIGN PATENT DOCUMENTS

| KR | 102346122 B1 \* | 12/2021 | |
| WO | WO-2019004350 A1 \* | 1/2019 | .......... G06N 3/0454 |
| WO | WO-2022075678 A2 \* | 4/2022 | |

OTHER PUBLICATIONS

An et al., "Variational Autoencoder based Anomaly Detection using Reconstruction Probability", Feb. 2015 Special Lecture on IE, 2015, 18 pages.

\* cited by examiner

*Primary Examiner* — Chae M Ko
(74) *Attorney, Agent, or Firm* — Oblon, McClelland, Maier & Neustadt, L.L.P.

(57) ABSTRACT

According to one embodiment, an information processing apparatus includes a processing circuit. The processing circuit calculates a first input/output error related to normal data and a second input/output error related to pseudo abnormal data different from the normal data, for each of a plurality of autoencoders having different network structures. The processing circuit outputs relational data indicating a relation between the network structure and the first input/output error and the second input/output error.

13 Claims, 11 Drawing Sheets

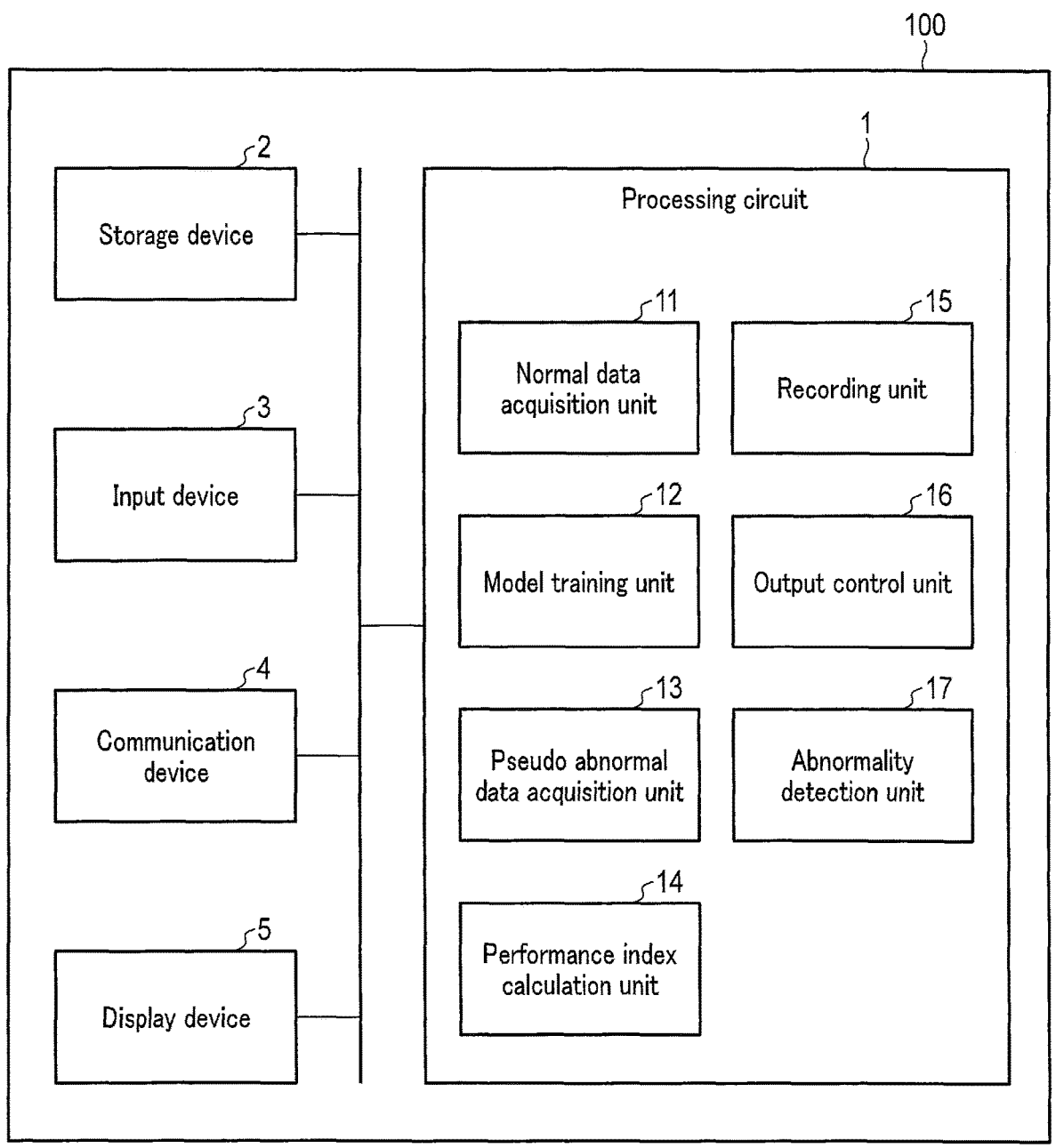
F I G. 1

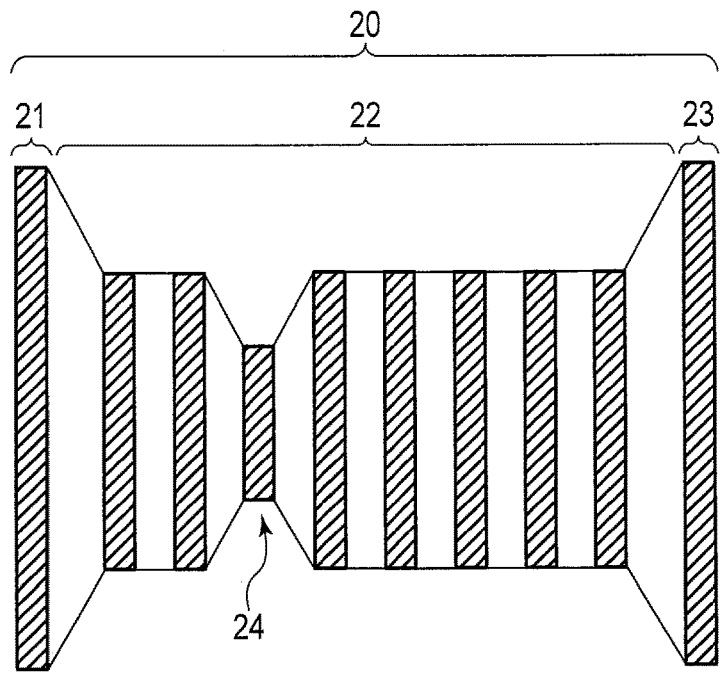
F I G. 2
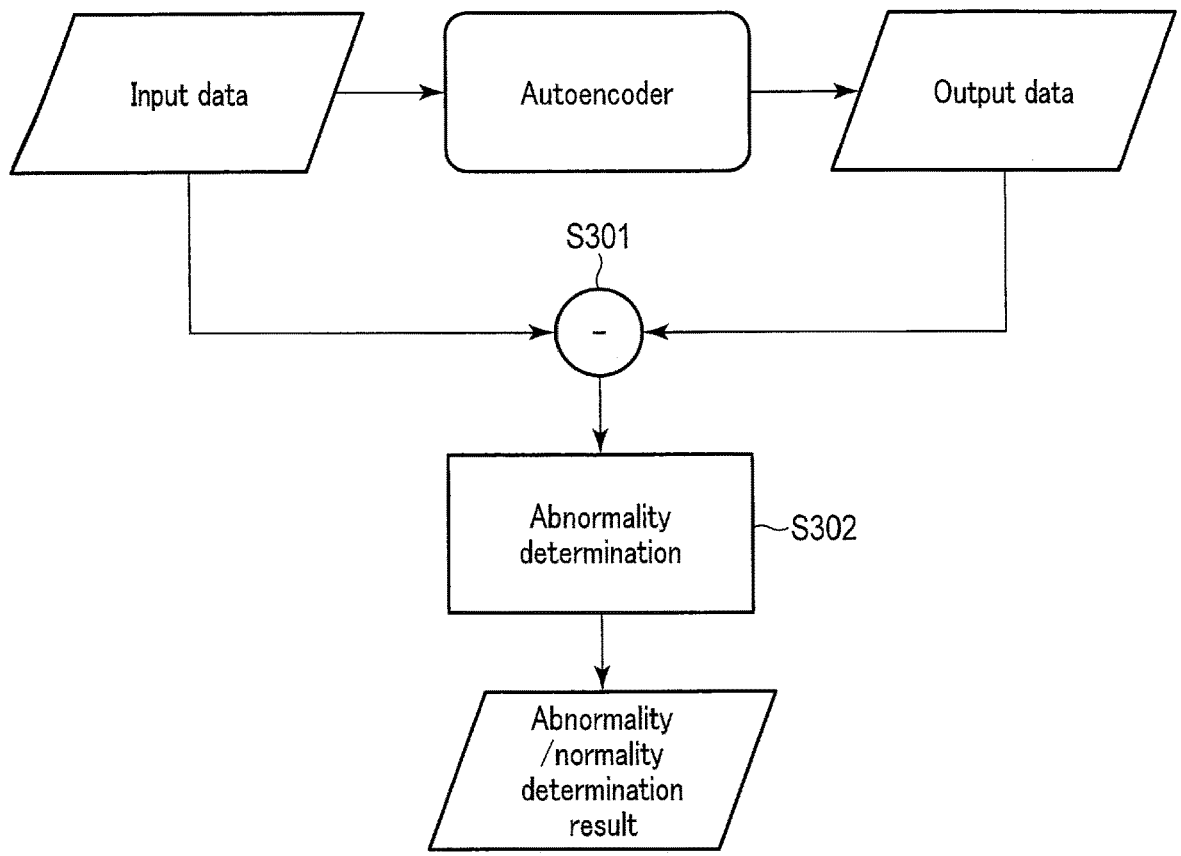
F I G. 3

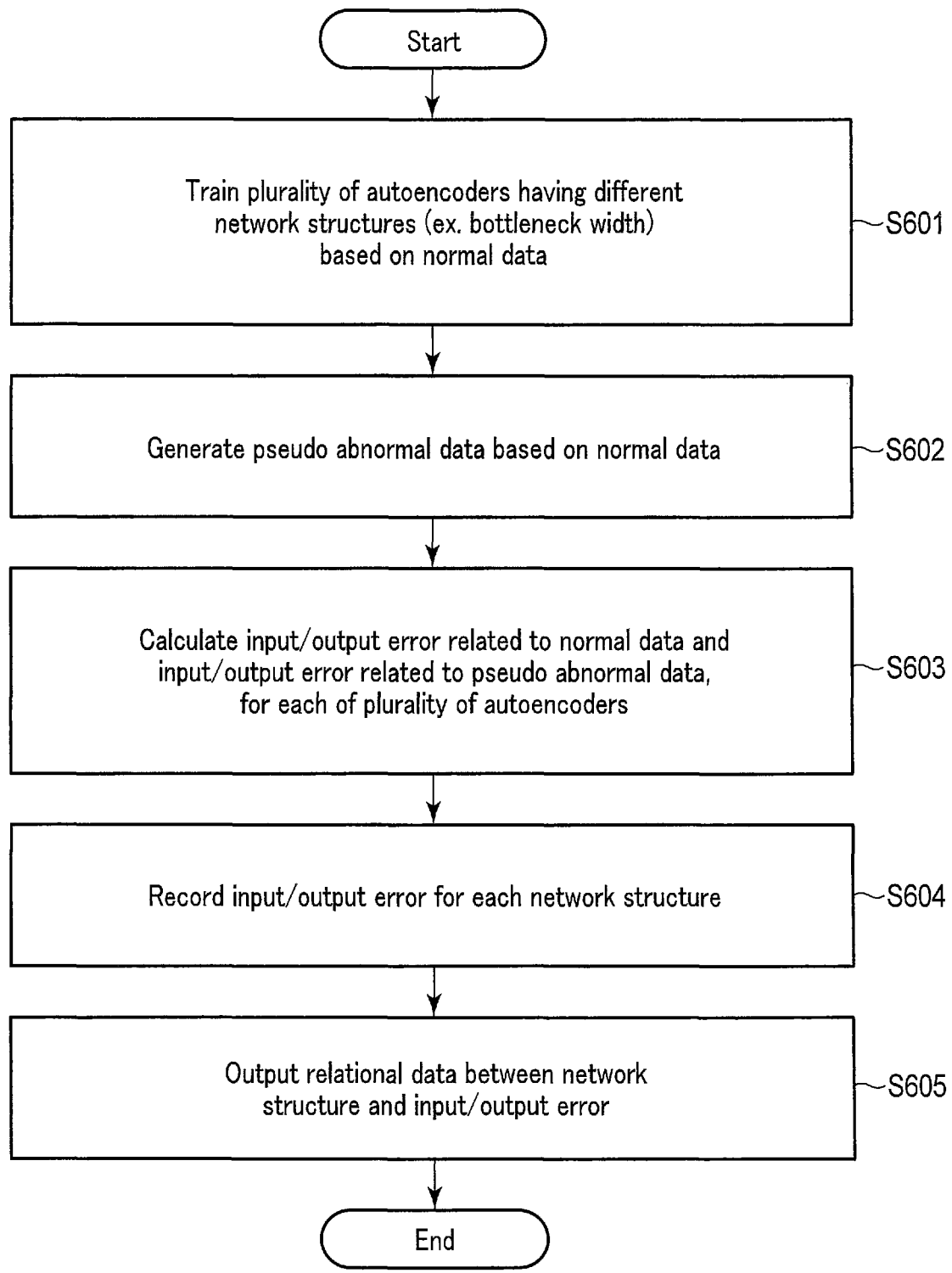
F I G. 6

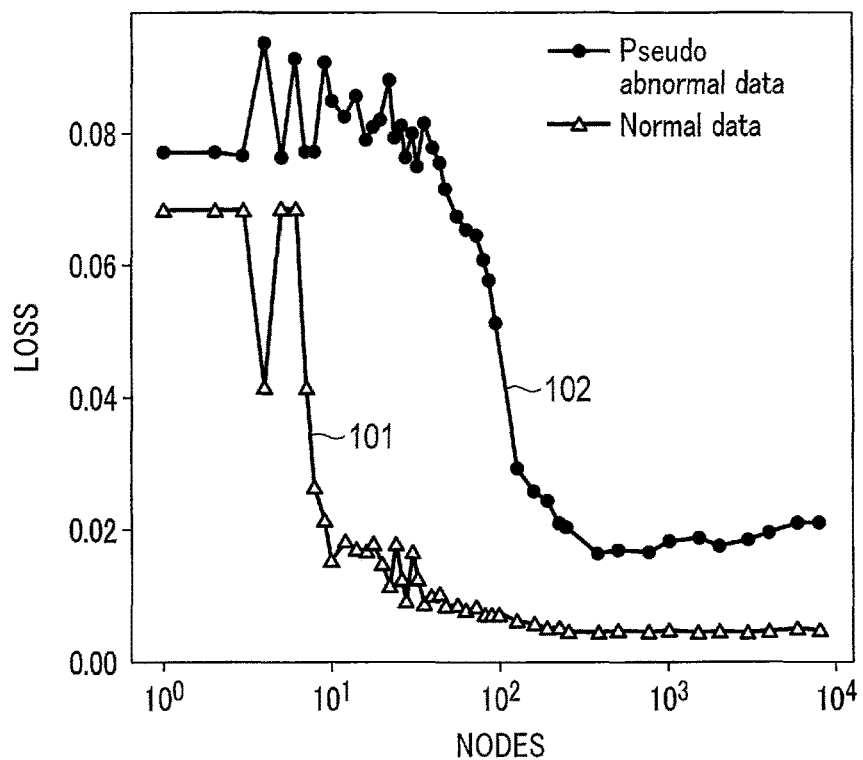
F I G. 10
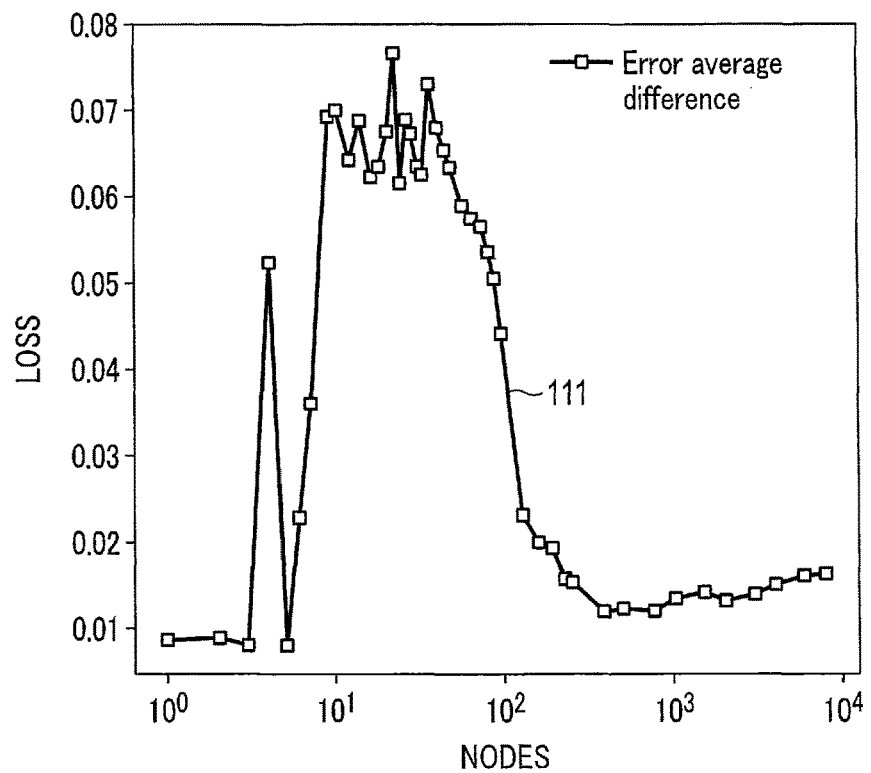
F I G. 11

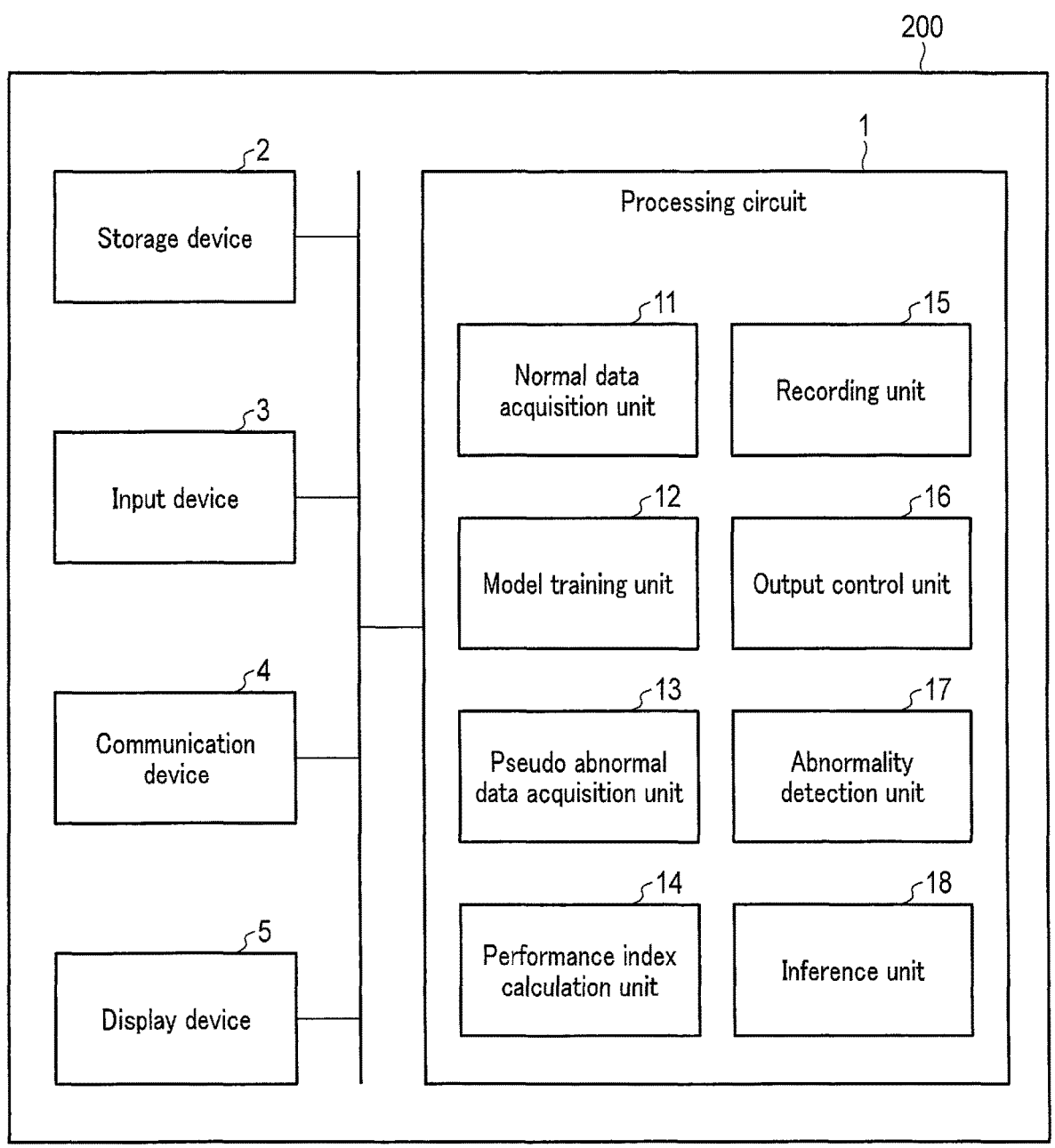
F I G. 12

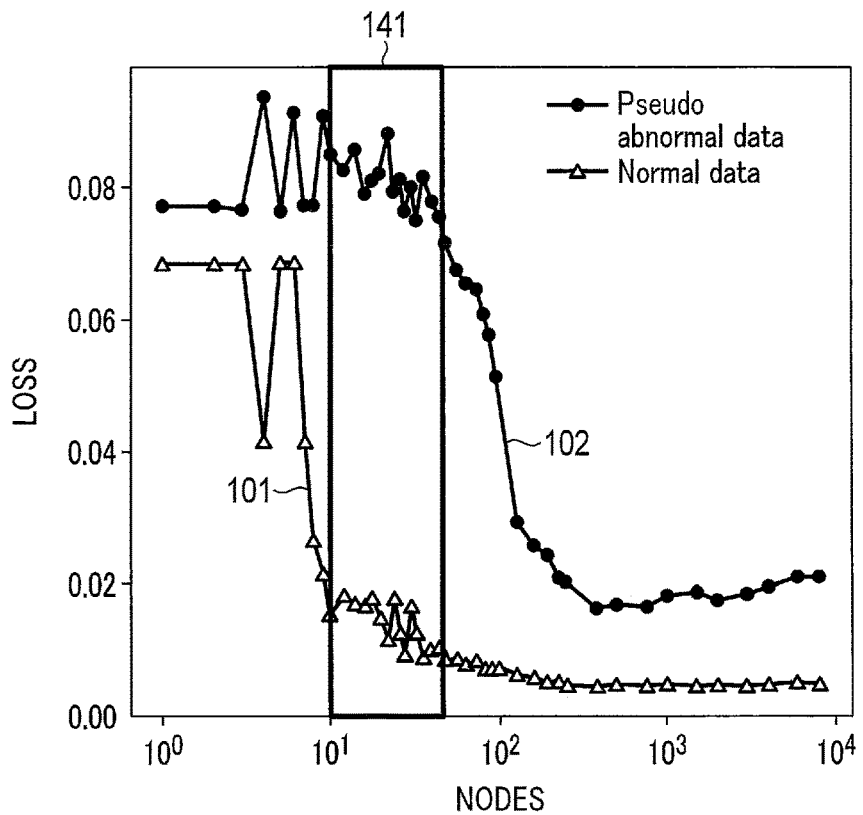
F I G. 14
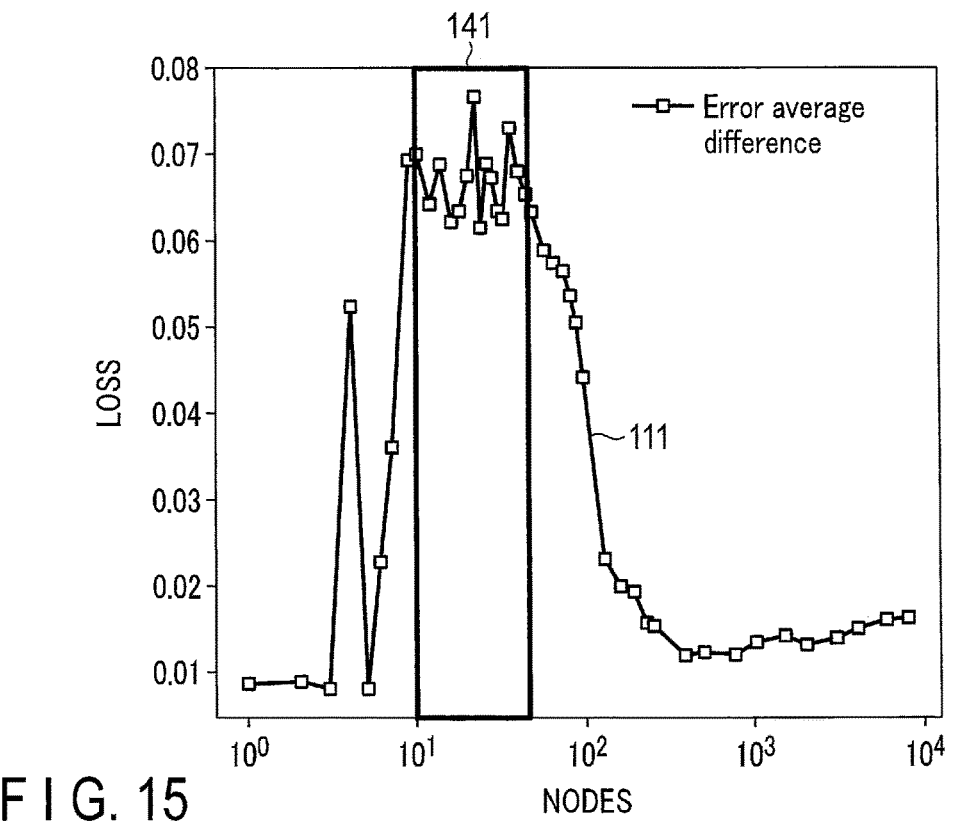
F I G. 15

INFORMATION PROCESSING APPARATUS, INFORMATION PROCESSING METHOD, AND STORAGE MEDIUM

CROSS-REFERENCE TO RELATED APPLICATIONS

This application is based upon and claims the benefit of priority from Japanese Patent Application No. 2021-096667, filed Jun. 9, 2021, the entire contents of which are incorporated herein by reference.

FIELD

Embodiments described herein relate generally to an information processing apparatus, an information processing method, and a storage medium.

BACKGROUND

An autoencoder is a neural network in which parameters have been trained so that input and output are matched. The autoencoder can also be used for abnormality detection by utilizing a property of not reproducing input data that is not used for training. However, depending on a network structure of the autoencoder, even normal data used for training may not be reproduced, or conversely, identity mapping that returns abnormal data not used for training, and abnormality detection performance is lowered in both cases.

BRIEF DESCRIPTION OF THE DRAWINGS

FIG. 1 is a diagram illustrating a configuration example of an information processing apparatus according to a first embodiment;

FIG. 2 is a diagram illustrating a processing example related to abnormality detection using an autoencoder;

FIG. 3 is a diagram illustrating a processing example of the abnormality detection using the autoencoder;

FIG. 6 is a diagram illustrating a typical flow of network structure design support processing by the information processing apparatus according to the first embodiment;

FIG. 10 is a diagram illustrating an example of a graph representing a relation between the number of bottleneck nodes and an error average;

FIG. 11 is a diagram illustrating an example of a graph representing a relation between the number of bottleneck nodes and an error average difference;

FIG. 12 is a diagram illustrating a configuration example of an information processing apparatus according to a second embodiment;

FIG. 14 is a diagram illustrating an example of a graph representing a relation between the number of bottleneck nodes and an error average on which a recommended range is superimposed;

FIG. 15 is a diagram illustrating an example of a graph representing a relation between the number of bottleneck nodes and an error average difference on which a recommended range is superimposed.

DETAILED DESCRIPTION

Figure 4:
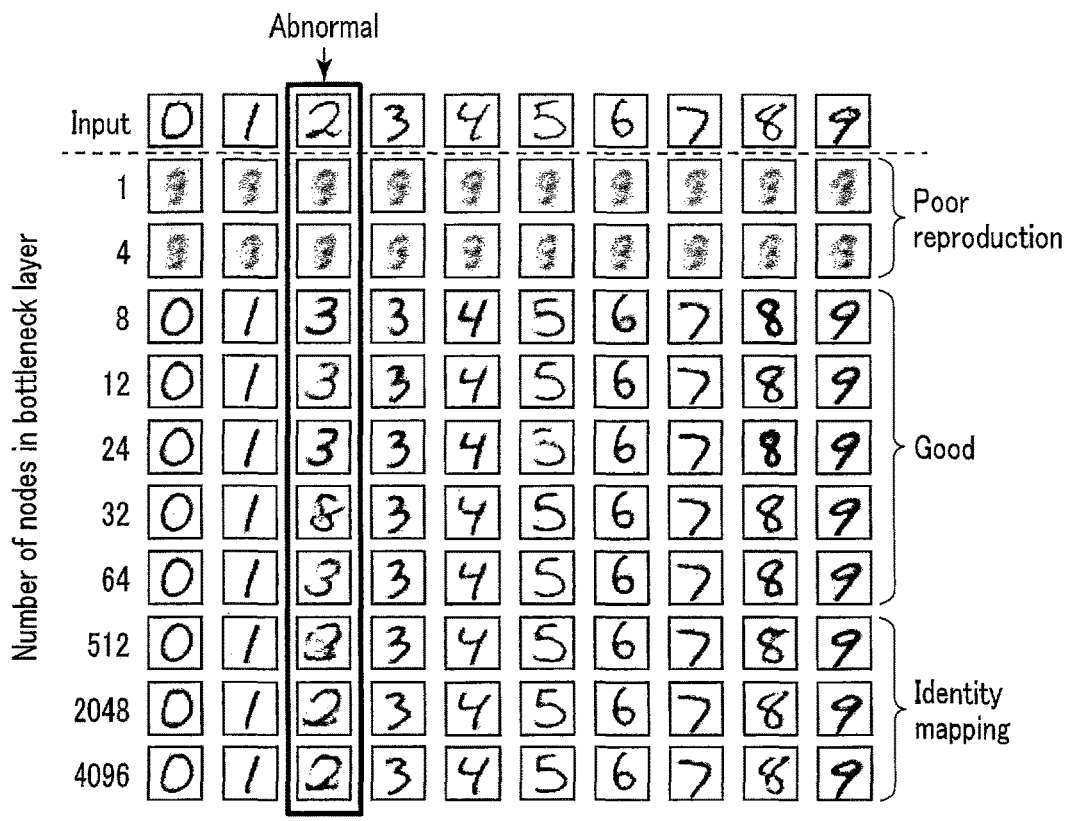
FIG. 4 is a diagram illustrating transition of output data for each number of bottleneck nodes.

An information processing apparatus according to an embodiment includes a processing circuit. The processing circuit calculates a first input/output error related to normal data and a second input/output error related to pseudo abnormal data different from the normal data for each of a plurality of autoencoders having different network structures. The processing circuit outputs relational data indicating a relation between the network structure and the first input/output error and the second input/output error.

Hereinafter, an information processing apparatus, an information processing method, and a storage medium according to the present embodiment will be described with reference to the drawings.

First Embodiment

FIG. 1 is a diagram illustrating a configuration example of an information processing apparatus 100 according to a first embodiment. As illustrated in FIG. 1, the information processing apparatus 100 is a computer including a processing circuit 1, a storage device 2, an input device 3, a communication device 4, and a display device 5. Data communication between the processing circuit 1, the storage device 2, the input device 3, the communication device 4, and the display device 5 is performed via a bus.

The processing circuit 1 includes a processor such as a central processing unit (CPU) and a memory such as a random access memory (RAM). The processing circuit 1 includes a normal data acquisition unit 11, a model training unit 12, a pseudo abnormal data acquisition unit 13, a performance index calculation unit 14, a recording unit 15, an output control unit 16, and an abnormality detection unit 17. The processing circuit 1 realizes functions of the respective units 11 to 17 by executing a design support program related to design support of a network structure of an autoencoder. The design support program is stored in a non-transitory computer-readable recording medium such as the storage device 2. The design support program may be mounted as a single program that describes all the functions of the respective units 11 to 17 described above, or may be mounted as a plurality of modules divided into several functional units. Each of the units 11 to 17 may be mounted by an integrated circuit such as an application specific integrated circuit (ASIC). In this case, each of the units 11 to 17 may be mounted on a single integrated circuit or may be individually mounted on a plurality of integrated circuits.

The normal data acquisition unit 11 acquires normal data. The normal data is a type of input data input to the autoencoder, and is data when an inspection target is normal. For example, in a case where the inspection target is a factory machine, the normal data is data output by the factory machine or an inspection device thereof when the factory machine normally operates. In addition, when the inspection target is an article such as a semiconductor product, the normal data is data output by an inspection device of the article when the article is normal.

The model training unit 12 trains a plurality of autoencoders having different network structures. Typically, the model training unit 12 trains a plurality of autoencoders based on normal data.

The pseudo abnormal data acquisition unit 13 acquires pseudo abnormal data. The pseudo abnormal data is abnormal data generated in a pseudo manner. The abnormal data is data different from the normal data. That is, the abnormal data is data that is not used for training of the autoencoder and cannot be reproduced by the autoencoder. For example, in a case where the inspection target is a factory machine, the normal data is data output by the factory machine or an inspection device thereof when the factory machine abnormally operates. When the inspection target is an article such as a semiconductor product, the normal data is data output by an inspection device of the article when the article is abnormal. In many cases, it is difficult to reproduce the abnormality of the inspection target in advance. For this reason, it is difficult to prepare the abnormal data at the time of training of the autoencoder. The pseudo abnormal data is abnormal data generated in a pseudo manner in order to evaluate abnormality detection performance of each autoencoder. The pseudo abnormal data may be data obtained by performing data augmentation on the normal data, or may be data in another domain different from the normal data.

The performance index calculation unit 14 calculates, for each of the plurality of autoencoders, a first input/output error related to the normal data and a second input/output error related to the pseudo abnormal data different from the normal data. The input/output error is also referred to as a reconfiguration error. Further, the performance index calculation unit 14 may calculate a difference between the first input/output error and the second input/output error. The first input/output error is an error between the normal data and output data of the autoencoder when the normal data is input. The second input/output error is an error between the pseudo abnormal data and output data of the autoencoder when the pseudo abnormal data is input. The first input/output error, the second input/output error, the difference between the first input/output error and the second input/output error, and the like are examples of indices (hereinafter, referred to as performance indices) for evaluating the performance of each autoencoder.

The recording unit 15 records the performance index in the storage device 2 or the like for each network structure of the autoencoder, and generates relational data (hereinafter, referred to as structure/performance relational data) between the network structure and the performance index.

The output control unit 16 outputs the structure/performance relational data. The structure/performance relational data may be displayed on the display device 5, may be output to an external device such as a computer via the communication device 4, or may be stored in the storage device 2.

The abnormality detection unit 17 performs abnormality detection using an autoencoder. For example, the abnormality detection unit 17 performs abnormality detection using an autoencoder selected by a user or the like via the input device 3 or the like among a plurality of autoencoders trained by the model training unit 12.

The storage device 2 includes a read only memory (ROM), a hard disk drive (HDD), a solid state drive (SSD), an integrated circuit storage device, and the like. The storage device 2 stores normal data, pseudo abnormal data, a performance index, structure/performance relational data, a setting program, and the like.

The input device 3 inputs various commands from the user. As the input device 3, a keyboard, a mouse, various switches, a touch pad, a touch panel display, and the like can be used. An output signal from the input device 3 is supplied to the processing circuit 1. Note that the input device 3 may be an input device of a computer connected to the processing circuit 1 in a wired or wireless manner.

The communication device 4 is an interface for performing data communication with an external device connected to the information processing apparatus 100 via a network.

The display device 5 displays various types of information. For example, the display device 5 displays the structure/performance relational data under the control of the output control unit 16. As the display device 5, a cathode-ray tube (CRT) display, a liquid crystal display, an organic electro luminescence (EL) display, a light-emitting diode (LED) display, a plasma display, or any other display known in the art can be appropriately used. Further, the display device 5 may be a projector.

Hereinafter, the information processing apparatus 100 according to the first embodiment will be described in detail.

First, a processing example of abnormality detection using an autoencoder executed by the abnormality detection unit 17 will be briefly described. FIG. 2 is a schematic diagram of an autoencoder 20. As illustrated in FIG. 2, the autoencoder 20 is a neural network including an input layer 21, a hidden layer 22, and an output layer 23. Input data is input to the input layer 21. The hidden layer 22 performs encoding and decoding on the input data in series, and converts the input data into output data. The output layer 23 outputs the output data.

As illustrated in FIG. 2, the hidden layer 22 includes a plurality of hidden layers. The plurality of hidden layers 22 may include a fully coupled layer, a convolution layer, or any other layer. The plurality of hidden layers 22 includes a bottleneck layer 24. The bottleneck layer 24 is a layer having the smallest width among the plurality of hidden layers 22. The "width" corresponds to the number of nodes in the fully coupled layer or the number of channels in the convolution layer. A position of the bottleneck layer 24 is not particularly limited as long as it is between the input layer 21 and the output layer 23. Note that the "position" corresponds to the number of hidden layers 22 from the input layer 21 or the output layer 23 to the bottleneck layer 24. The "position" is also referred to as a depth. The width and the position are one of parameters defining the network structure. The input data is propagated from the input layer 21 to the bottleneck layer 24 and reduced to a feature map, and the feature map is propagated from the bottleneck layer 24 to the output layer 23 and restored to output data having the same resolution as the input data. The autoencoder 20 is also referred to as an encoder/decoder/network.

FIG. 3 is a diagram illustrating a processing example of the abnormality detection using the autoencoder. As illustrated in FIG. 3, the abnormality detection unit 17 inputs input data to the autoencoder and generates output data corresponding to the input data. The input data is assumed to be image data, waveform data, or the like, but may be data in any format. In a case of an ideal autoencoder, when the input data is normal data, output data obtained by reproducing the input data is output from the autoencoder, and when the input data is abnormal data, output data different from the input data is output from the autoencoder.

As illustrated in FIG. 3, the abnormality detection unit 17 calculates an input/output error between the input data and the output data (step S301). The input/output error is an index based on a difference between the same sampling points of an input data value and an output data value. When the input data is normal data, the input/output error is substantially zero. When the input data is abnormal data, the input/output error does not become substantially zero.

When step S301 is performed, the abnormality detection unit 17 determines the presence or absence of an abnormality based on the input/output error (step S302). For example, when the input/output error is equal to or larger than a threshold value, the abnormality is determined, and when the input/output error is less than the threshold value, the normality is determined. That is, in a case where the input data is normal data, since the input/output error is less than the threshold value, the normality is determined. In a case where the input data is abnormal data, since the input/output error is equal to or larger than the threshold value, the abnormality is determined. In this way, the abnormality detection is performed using the autoencoder.

It is assumed that the abnormality detection performance according to the present embodiment is the performance of the autoencoder, and is the ability to correctly reproduce input data to be normal data and not to correctly reproduce input data to be abnormal data. The abnormality detection performance depends on the network structure such as the width or the position of the bottleneck layer 24.

FIG. 4 is a diagram illustrating a transition of output data for each number of nodes (hereinafter, referred to as the number of bottleneck nodes) in the bottleneck layer. As illustrated in FIG. 4, it is assumed that the input data is image data in which numerals from "0" to "9" have been drawn. It is assumed that, in the autoencoder, image data of "0", "1", and "3" to "9" is trained and image data of "2" is not trained. That is, "0", "1", and "3" to "9" are normal data, and "2" is abnormal data. As illustrated in FIG. 4, in a case where the number of bottleneck nodes is four or less, the autoencoder cannot reproduce not only the abnormal data but also the normal data. In a case where the number of bottleneck nodes is 512 or more, the autoencoder can reproduce not only the normal data but also the abnormal data, and identity mapping learning is performed. In these cases, it can be said that the autoencoder cannot exhibit good abnormality detection performance. On the other hand, in a case where the number of bottleneck nodes is in a range of 8 to 64, it can be said that the autoencoder can reproduce the normal data, but cannot reproduce the abnormal data, and exhibits good abnormality detection performance.

Figure 5:
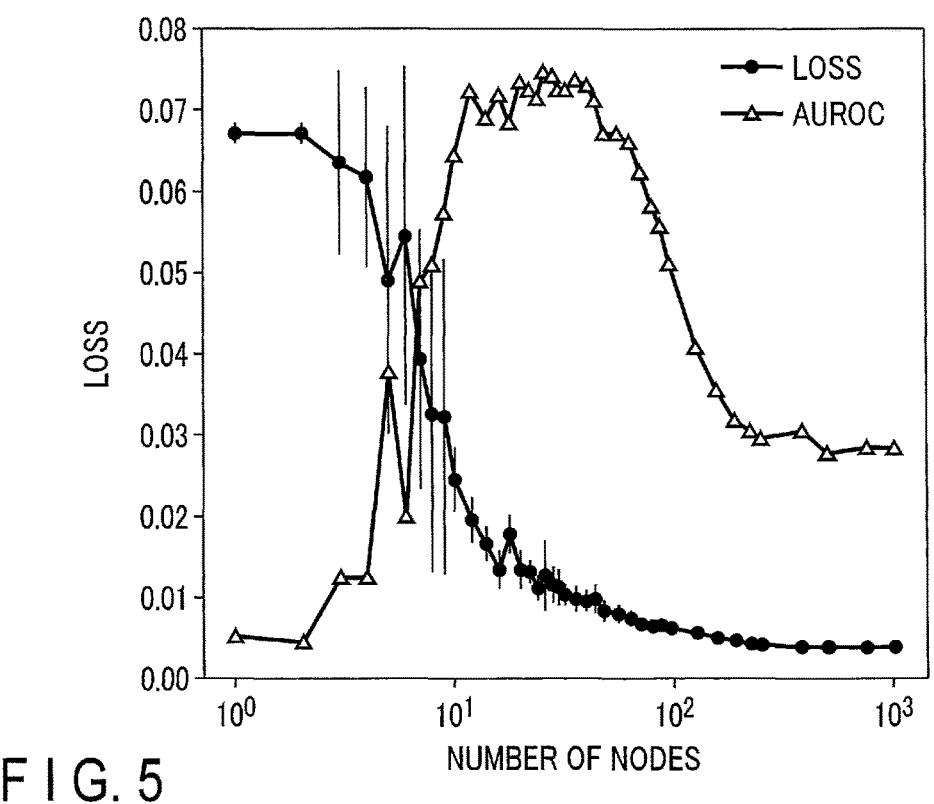
FIG. 5 is a graph representing a relation between an input/output error and AUROC for each number of bottleneck nodes.

FIG. 5 is a graph representing a relation between an input/output error (LOSS) and AUROC for each number of bottleneck nodes (NUMBER OF NODES). In FIG. 5, a horizontal axis represents the number of bottleneck nodes, a left vertical axis represents the input/output error, and a right vertical axis represents AUROC. The input/output error in FIG. 5 is an input/output error reflecting both an input/output error related to normal data and an input/output error related to abnormal data. AUROC is an AUC (area under the curve) of an ROC curve. AUROC is a ratio between a true positive rate, which is a ratio at which the abnormal data is not correctly reproduced, and a true negative rate, which is a ratio at which the normal data is correctly reproduced, and is an example of a performance index for evaluating the abnormality detection performance of the autoencoder. In supervised learning, it is possible to experimentally determine an optimum learning parameter depending on the magnitude of the input/output error. However, as illustrated in FIG. 5, in unsupervised learning performed by the autoencoder, AUROC is not necessarily improved even if the input/output error is lowered. Therefore, it is not possible to determine the optimum learning parameter of the autoencoder only by minimizing the input/output error. This is because, as illustrated in FIG. 4, when the number of bottleneck nodes is increased to reduce the input/output error, identity mapping occurs, and as a result, the abnormality detection performance is deteriorated. Note that the learning parameter is a parameter such as a weighting coefficient or bias trained by machine learning.

The information processing apparatus 100 according to the first embodiment supports provision of a network structure of an autoencoder having good abnormality detection performance.

FIG. 6 is a diagram illustrating a typical flow of network structure design support processing by the information processing apparatus 100 according to the first embodiment. The processing circuit 1 starts the network structure design support processing by reading and executing a design support program from the storage device 2 in accordance with a start instruction input by the user via the input device 3 or a predetermined trigger set in advance. It is assumed that the normal data is already acquired by the normal data acquisition unit 11 at a start time point of FIG. 6 and stored in the storage device 2. The normal data is not particularly limited, but is assumed to be image data in which Arabic numerals are drawn as illustrated in FIG. 4. One numeral is drawn in each piece of image data. The drawn Arabic numeral may be one digit or two or more digits, and the same numeral may be drawn in two or more pieces of image data.

As illustrated in FIG. 6, the model training unit 12 trains a plurality of autoencoders having different network structures based on the normal data (step S601). In step S601, the model training unit 12 individually performs unsupervised learning on the plurality of autoencoders based on common normal data. As a result, learning parameters such as weights or biases of the respective autoencoders are determined.

Examples of the network structure set differently in the plurality of autoencoders include a width and a position related to the bottleneck layer. As described above, the width means the number of nodes or the number of channels. The position means the depth of the bottleneck layer from the input layer or the output layer. In the present embodiment, it is assumed that the width of the bottleneck layer, more specifically, the number of bottleneck nodes is different in the plurality of autoencoders.

Figure 7:
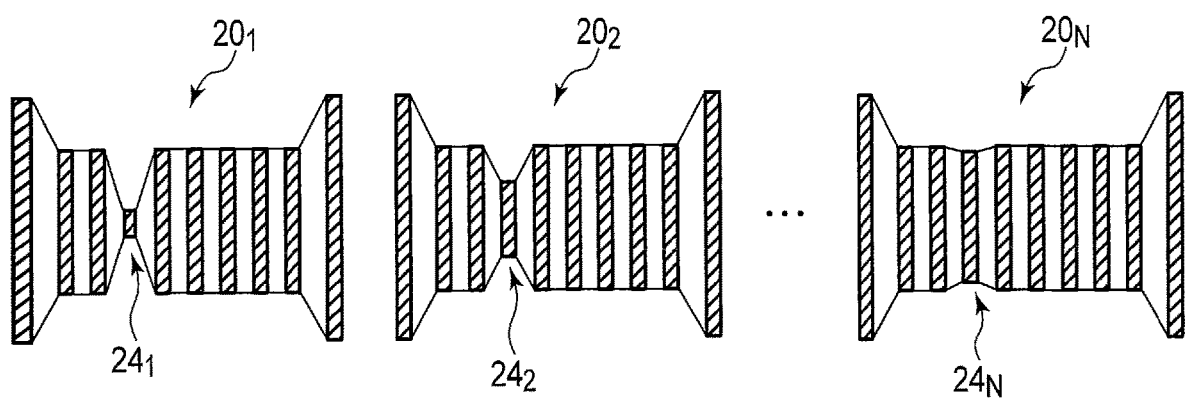
FIG. 7 is a diagram schematically illustrating a plurality of autoencoders trained in step S601 of FIG. 6.

FIG. 7 is a diagram schematically illustrating a plurality of autoencoders $20_n$ trained in step S601. Note that "n" represents a number of the autoencoder, and $2 \leq n \leq N$ is satisfied. "N" is the total number of autoencoders, and $N \geq 2$ is satisfied. As illustrated in FIG. 7, N untrained autoencoders $20_n$ are prepared. Each autoencoder $20_n$ is designed such that the number of nodes (the number of bottleneck nodes) in a bottleneck layer $24_n$ which is an example of the network structure is different. It is assumed that the width of each layer is the same, except for the bottleneck layer $24_n$. In addition, it is assumed that the position of the bottleneck layer $24n$ is the same. The number of autoencoders to be trained is not particularly limited. In addition, the lower limit and the upper limit of the number of bottleneck nodes are not particularly limited.

When step S601 is performed, the pseudo abnormal data acquisition unit 13 generates pseudo abnormal data based on the normal data (step S602).

Figure 8:
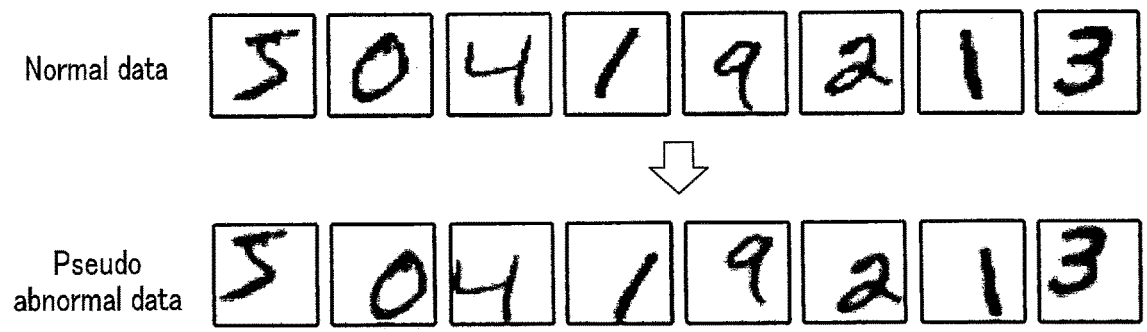
FIG. 8 is a diagram schematically illustrating pseudo abnormal data generation processing.

FIG. 8 is a diagram schematically illustrating pseudo abnormal data generation processing. As illustrated in FIG. 8, the pseudo abnormal data acquisition unit 13 generates pseudo abnormal data by performing data augmentation on the normal data used for training of the autoencoder in step S601. The data augmentation is horizontal movement or parallel movement, for example, shifting several pixels horizontally and/or vertically. In addition, the data augmentation may be other modifications such as inversion and rotation. Note that it is assumed that the data augmentation is not accompanied by deformation of an image size. That is, image sizes of the normal data and the pseudo abnormal data are the same.

When step S602 is performed, the performance index calculation unit 14 calculates an input/output error related to the normal data and an input/output error related to the pseudo abnormal data, for each of the plurality of autoencoders (step S603).

Figure 9:
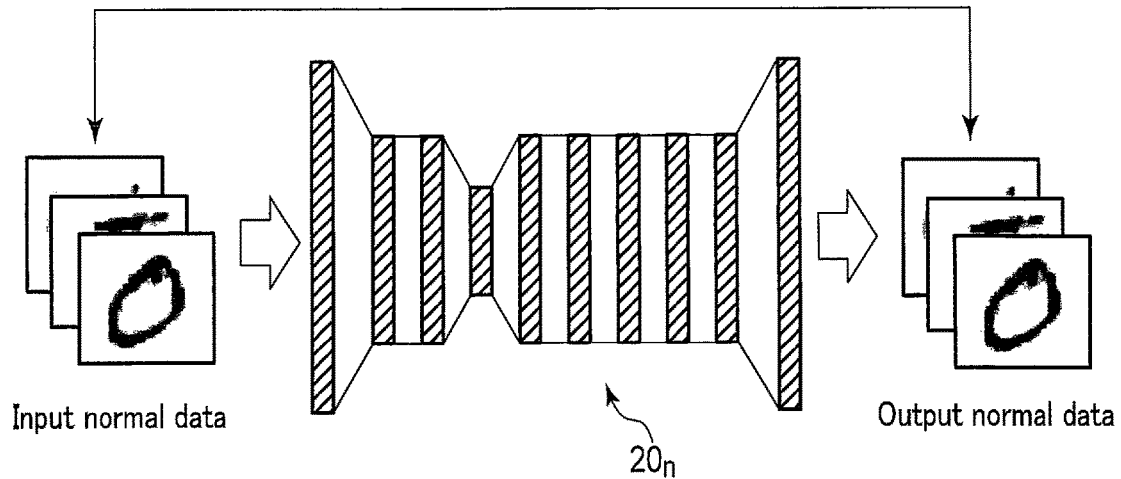
FIG. 9 is a diagram schematically illustrating calculation processing of an input/output error related to each of normal data and pseudo abnormal data for each autoencoder.
Figure 9:
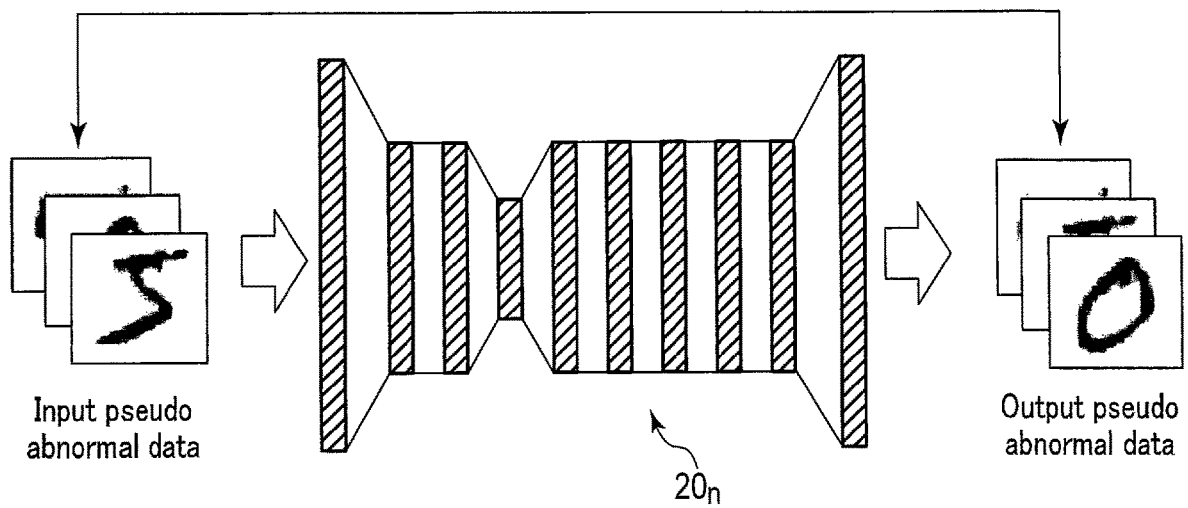

FIG. 9 is a diagram schematically illustrating calculation processing of an input/output error related to each of the normal data and the pseudo abnormal data for each autoencoder $20_n$. As illustrated in FIG. 9, the performance index calculation unit 14 first inputs the normal data (input normal data) to the autoencoder $20_n$ and calculates output data (output normal data) corresponding to the normal data. In addition, the performance index calculation unit 14 calculates an error between the input normal data and the output normal data as an input/output error. Similarly, the performance index calculation unit 14 first inputs the pseudo abnormal data (input pseudo abnormal data) to the autoencoder $20_n$, and calculates output data (hereinafter, referred to as output pseudo abnormal data) corresponding to the pseudo abnormal data. In addition, the performance index calculation unit 14 calculates an error between the input pseudo abnormal data and the output pseudo abnormal data as an input/output error. The performance index calculation unit 14 calculates input/output errors for both the normal data and the pseudo abnormal data, for each of the plurality of autoencoders $20_n$. The input/output error is an index for evaluating an error between the input data and the output data. As the input/output error, for example, an error average may be used. The error average is defined as an average of differences between the input data and the output data for each pixel.

Here, the normal data and the pseudo abnormal data are defined as $x^n_i$ and $x^{pa}_i$, respectively. "i" indicates i-th data. The outputs of the autoencoder of the number k of bottleneck nodes when the inputs are $x^n_i$ and $x^{pa}_i$, are defined as $y^n_i(k)$ and $y^{pa}_i(k)$, respectively. An input/output error average $L_n(k)$ related to the normal data is calculated by the following formula (1), and an input/output error average $L_{pa}(k)$ related to the pseudo abnormal data is calculated by the following formula (2). In the formula (1), $N_n$ indicates the number of data in the normal data, and in the formula (2), $N_{pa}$ indicates the number of data in the pseudo abnormal data.

$$L_n(k) = \frac{1}{N_n} \sum_j^{N_n} \|y^n_j(k) - x^n_j\|^2 \quad (1)$$

$$L_{pa}(k) = \frac{1}{N_{pa}} \sum_j^{N_{pa}} \|y^{pa}_j(k) - x^{pa}_j\|^2 \quad (2)$$

When step S603 is performed, the recording unit 15 records an input/output error for each network structure (step S604). More specifically, an input/output error related to the normal data and an input/output error related to the pseudo abnormal data are recorded for each network structure. The structure/performance relational data indicating the relation between the input/output error related to the normal data and the input/output error related to the pseudo abnormal data for each network structure is referred to as structure/error relational data. For example, when the network structure is the number of bottleneck nodes, the recording unit 15 records the number k of bottleneck nodes and the error averages $L_n(k)$ and $L_{pa}(k)$ at the number of bottleneck nodes as the structure/error relational data. Further, the recording unit 15 may record, as the structure/error relational data, the number k of bottleneck nodes and a difference (hereinafter, referred to as an error average difference) $L_{pa}(k)-L_n(k)$ between the error average $L_{pa}(k)$ and the error average $L_n(k)$ at the number of bottleneck nodes. The error average difference is an example of the performance index related to the network structure, and is calculated by the performance index calculation unit 14.

When step S604 is performed, the output control unit 16 outputs relational data (structure/error relational data) between the network structure and the input/output error (step S605). In step S605, the output control unit 16 displays a graph representing the structure/error relational data on the display device 5 as the structure/error relational data. As the graph representing the structure/error relational data, a graph representing a relation between the number of bottleneck nodes and the error average or a graph representing a relation between the number of bottleneck nodes and the error average difference is displayed.

FIG. 10 is a diagram illustrating an example of a graph representing a relation between the number of bottleneck nodes and the error average. As illustrated in FIG. 10, in the graph, a vertical axis represents the error average (LOSS), and a horizontal axis represents the number of bottleneck nodes (NODES). FIG. 10 illustrates a curve 101 representing the error average related to the normal data and a curve 102 representing the error average related to the pseudo abnormal data. FIG. 11 is a diagram illustrating an example of a graph representing a relation between the number of bottleneck nodes and the error average difference. As illustrated in FIG. 11, in the graph, a vertical axis represents the error average difference (DIFF), and a horizontal axis represents the number of bottleneck nodes (NODES). FIG. 11 illustrates a curve 111 representing the error average difference. It can be seen whether the normal data can be reproduced with the error average $L_n(k)$ related to the normal data. It can be seen whether identity mapping occurs in the error average $L_{pa}(k)$ related to the pseudo abnormal data.

The user determines the optimum number of bottleneck nodes by observing the graphs in FIGS. 10 and 11. The user may determine the number of bottleneck nodes having a small error average $L_n(k)$ and a large error average $L_{pa}(k)$ as an optimum network structure. Alternatively, the number of bottleneck nodes when the error average difference $L_{pa}(k)-L_n(k)$ is large is determined as the optimum network structure. In the cases of FIGS. 10 and 11, it can be seen that poor reproduction of the normal data is eliminated when the number of bottleneck nodes is approximately 8 or more, and identity mapping of the pseudo abnormal data occurs when the number of bottleneck nodes is approximately 100 or more. In this case, since an autoencoder having the number of bottleneck nodes of 8 or more and less than 100 is expected to have relatively high accuracy, an autoencoder having any number of bottleneck nodes in this range may be determined as an autoencoder having the optimum number of bottleneck nodes.

Whether to display the graphs of both the error average $L_n(k)$ and the error average $L_{pa}(k)$ or the graph of the error average difference $L_{pa}(k)-L_n(k)$ can be arbitrarily designated by the user via the input device 3 or the like. Further, the graph of either the error average $L_n(k)$ or the error average $L_{pa}(k)$ may be displayed.

The optimum network structure may be determined from those trained in step S601, or a network structure not trained in step S601 may be determined. When the network structure not trained in step S601 is determined, an autoencoder having the network structure may be trained by the model training unit 12. At this time, the model training unit 12 may perform unsupervised learning of the autoencoder having the network structure based on the normal data. Thereafter, abnormality detection may be performed by the abnormality detection unit 17 using the autoencoder determined by the user.

When step S605 is performed, the design support processing illustrated in FIG. 6 ends.

Note that the first embodiment can be variously modified. As an example, the information processing apparatus 100 may not include the model training unit 12. In this case, the information processing apparatus 100 may acquire a plurality of autoencoders having different network structures trained by the external device according to step S601. As another example, the information processing apparatus 100 may not include the abnormality detection unit 17.

According to the above embodiment, the information processing apparatus 100 includes the performance index calculation unit 14 and the output control unit 16. The performance index calculation unit 14 calculates a first input/output error related to normal data and a second input/output error related to pseudo abnormal data different from the normal data, for each of a plurality of autoencoders having different network structures. The output control unit 16 outputs relational data indicating a relation between the network structure and the first input/output error and the second input/output error.

The first input/output error functions as an index for measuring the degree of reproduction of the normal data, and the second input/output error functions as an index for measuring the degree of identity mapping of the pseudo abnormal data. The different network structures such as the width and the position of the bottleneck layer greatly affect the abnormality detection accuracy by the autoencoder. As described above, by outputting the relational data indicating the relation between the network structure and the first input/output error and the second input/output error, it is possible to support the design of the optimum network structure of the autoencoder. Therefore, it is possible to obtain an autoencoder having good abnormality detection performance. Further, according to the present embodiment, a plurality of autoencoders may be trained by unsupervised learning instead of supervised learning using actual abnormal data. Accordingly, it is possible to achieve good abnormality detection performance without using the actual abnormal data.

Second Embodiment

An information processing apparatus according to a second embodiment infers an optimum network structure. Hereinafter, the second embodiment will be described. Note that, in the following description, components having substantially the same functions as those of the first embodiment will be denoted by the same reference numerals, and duplicate explanations will be given only when necessary.

FIG. 12 is a diagram illustrating a configuration example of an information processing apparatus 200 according to the second embodiment. As illustrated in FIG. 12, a processing circuit 1 of the information processing apparatus 200 includes an inference unit 18 in addition to a normal data acquisition unit 11, a model training unit 12, a pseudo abnormal data acquisition unit 13, a performance index calculation unit 14, a recording unit 15, an output control unit 16, and an abnormality detection unit 17.

The inference unit 18 infers a recommended range or an optimum value of a network structure based on a structure/error relational data indicating a relation between an input/output error related to normal data and an input/output error related to pseudo abnormal data.

Figure 13:
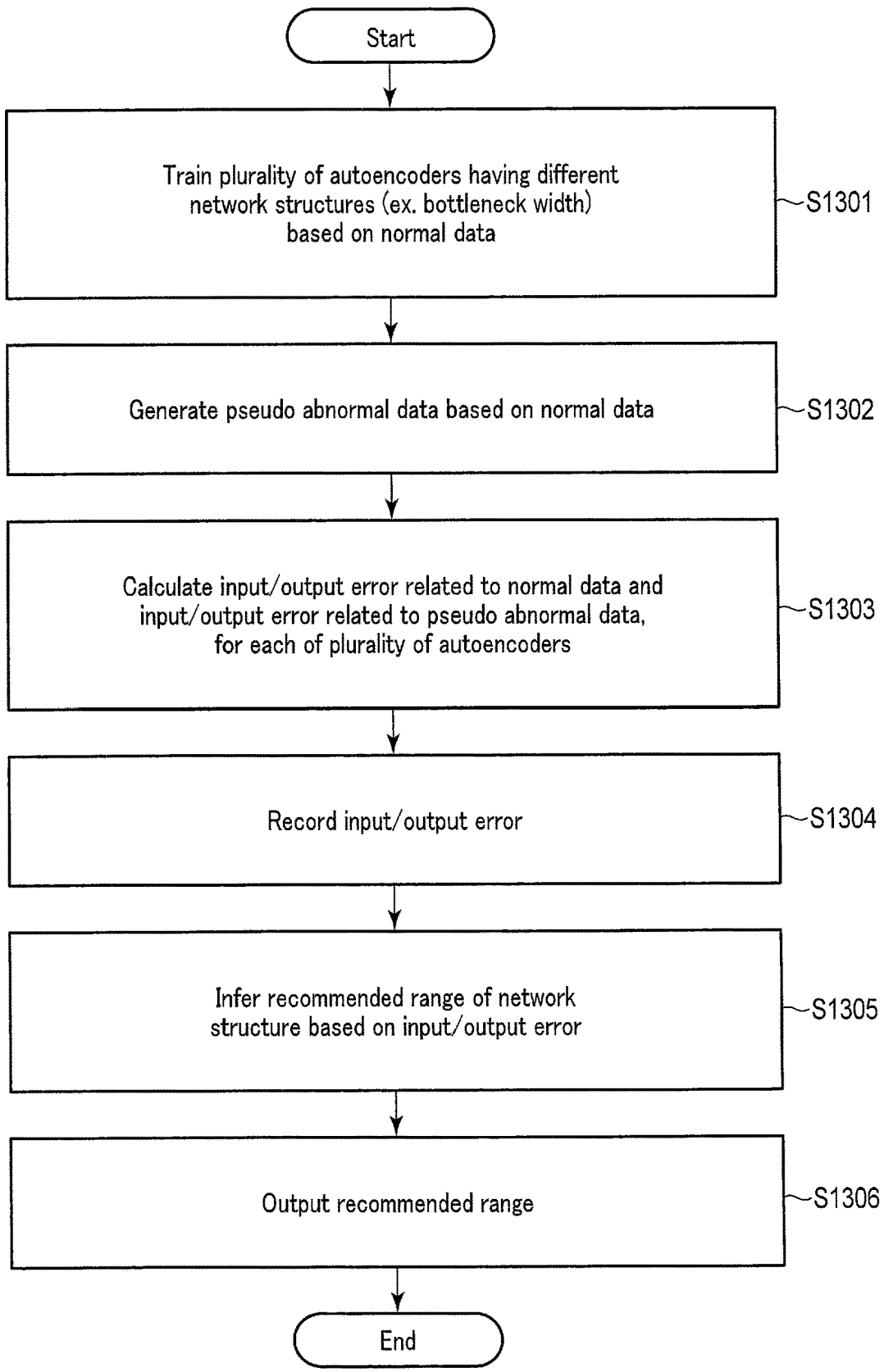
FIG. 13 is a diagram illustrating a typical flow of network structure design support processing by the information processing apparatus according to the second embodiment.

FIG. 13 is a diagram illustrating a typical flow of network structure design support processing by the information processing apparatus 200 according to the second embodiment. The processing circuit 1 starts the network structure design support processing by reading and executing a design support program from the storage device 2 in accordance with a start instruction input by the user via the input device 3 or a predetermined trigger set in advance. Since steps S1301 to S1304 illustrated in FIG. 13 are similar to steps S601 to S604 illustrated in FIG. 6, the description thereof is omitted here. In addition, it is assumed that the network structure is the number of bottleneck nodes.

When step S1304 is performed, the inference unit 18 infers the recommended range of the network structure (the number of bottleneck nodes) based on the input/output error recorded in step S1304 (step S1305). More specifically, the inference unit 18 infers the recommended range of the number of bottleneck nodes based on the difference between the input/output error related to the normal data and the input/output error related to the pseudo abnormal data.

FIG. 14 is a diagram illustrating an example of a graph representing a relation between the number of bottleneck nodes and an error average on which a recommended range 141 is superimposed. FIG. 15 is a diagram illustrating an example of a graph representing a relation between the number of bottleneck nodes and an error average difference on which the recommended range 141 is superimposed. Note that the error average is an example of the input/output error, and the error average difference is an example of a difference between the input/output error related to the normal data and the input/output error related to the pseudo abnormal data. As illustrated in FIGS. 14 and 15, the recommended range 141 is set to a range of the number of bottleneck nodes in which the error average difference is equal to or larger than a threshold value. In the cases of FIGS. 14 and 15, the threshold value is set to about 0.06. The recommended range 141 means a range in which the degree of reproduction of the normal data is a first level or more and the degree of identity mapping of the pseudo abnormal data is a second level or less. The degree of reproduction of the normal data is evaluated by the input/output error of the normal data. A smaller input/output error means a higher degree of reproduction. In the case of FIG. 14, the first level is set to about 0.02. The degree of identity mapping of the pseudo abnormal data is evaluated by the input/output error of the pseudo abnormal data. A smaller input/output error means a higher degree of identity mapping. In the case of FIG. 14, the second level is set to about 0.07. It can be said that an autoencoder having the number of bottleneck nodes satisfying the recommended range 141 defined as described above has a high degree of reproduction of the normal data and a low degree of reproduction of the abnormal data, and has high abnormality detection accuracy.

When step S1305 is performed, the output control unit 16 outputs the recommended range inferred in step S1305 (step S1306). In step S1306, the output control unit 16 displays the recommended range on a display device 5. For example, the output control unit 16 may display the recommended range 141 to be superimposed on the graph representing the relation between the number of bottleneck nodes and the error average as illustrated in FIG. 14, or may display the recommended range 141 to be superimposed on the graph representing the relation between the number of bottleneck nodes and the error average difference as illustrated in FIG. 15. By displaying the recommended range as described above, the user can easily confirm the recommended range 141. In addition, the reliability of the recommended range 141 can be estimated by displaying the recommended range 141 to be superimposed on a graph representing a relation between the input/output error and the number of bottleneck nodes.

When step S1306 is performed, the design support processing illustrated in FIG. 13 ends. The abnormality detection may be performed by the abnormality detection unit 17 using the autoencoder determined by the user. Note that the abnormality detection unit 17 may not be included in the information processing apparatus 200.

Note that the design support processing illustrated in FIG. 13 can be variously modified. In the above embodiment, the inference unit 18 infers the recommended range of the network structure based on the difference between the input/output error related to the normal data and the input/output error related to the pseudo abnormal data. However, a method for inferring the recommended range is not limited thereto. For example, the inference unit 18 may infer the recommended range based on a change in the input/output error of the normal data, the input/output error of the pseudo abnormal data, and/or the input/output error difference accompanying a change in the network structure.

Referring to FIG. 14, a range from the number of bottleneck nodes at which the input/output error of the normal data rapidly decreases to the number of bottleneck nodes at which the input/output error of the pseudo abnormal data rapidly decreases may be set to the recommended range. Specifically, the inference unit 18 calculates a differential value at the number of bottleneck nodes for each number of bottleneck nodes, for each of the input/output error of the normal data and the input/output error of the pseudo abnormal data. In addition, the inference unit 18 specifies the minimum number of nodes in the recommended range based on each differential value of the input/output error of the normal data. For example, the number of bottleneck nodes at which the differential value takes the minimum value, the number of bottleneck nodes immediately before the differential value converges to a range in which the differential value is smaller than the threshold value and the absolute value is relatively small, and the like may be specified as the minimum number of nodes. Further, the inference unit 18 specifies the maximum number of nodes in the recommended range based on the differential value of the input/output error of each piece of pseudo abnormal data. For example, the number of bottleneck nodes at which the differential value takes the minimum value, the number of bottleneck nodes immediately before the differential value converges to a range in which the differential value is smaller than the threshold value and the absolute value is relatively small, and the like may be specified as the maximum number of nodes. A range from the minimum number of nodes to the maximum number of nodes is set as the recommended range. The minimum number of nodes at which the input/output error of the normal data rapidly decreases and the maximum number of nodes at which the input/output error of the pseudo abnormal data rapidly decreases may be specified based on a curve shape of the input/output error of the normal data and a curve shape of the pseudo abnormal data. A range from the minimum number of nodes to the maximum number of nodes is set as the recommended range.

Referring to FIG. 15, a range from the number of bottleneck nodes where the input/output error difference rapidly increases to the number of bottleneck nodes where the input/output error difference rapidly decreases may be set to the recommended range. Specifically, the inference unit 18 calculates a differential value of the input/output error difference at the number of bottleneck nodes for each number of bottleneck nodes. In addition, the inference unit 18 specifies the minimum number of nodes and the maximum number of nodes in the recommended range based on each differential value of the input/output error difference. For example, the number of bottleneck nodes at which the differential value takes the minimum value, the number of bottleneck nodes immediately before the differential value converges to a range in which the differential value is larger than the threshold value and the absolute value is relatively small, and the like may be specified as the minimum number of nodes. Further, the number of bottleneck nodes at which the differential value takes the minimum value, the number of bottleneck nodes immediately after the differential value converges to a range in which the differential value is smaller than the threshold value and the absolute value is relatively small, and the like may be specified as the maximum number of nodes. The minimum number of nodes at which the input/output error difference rapidly increases and the maximum number of nodes at which the input/output error difference rapidly decreases may be specified based on the curve shape of the input/output error difference, and a range from the minimum number of nodes to the maximum number of nodes may be specified as the recommended range. A predetermined range such as 90% of the maximum value of the input/output error difference may be specified as the recommended range.

In the above embodiment, the inference unit 18 infers the recommended range. However, the inference unit 18 may infer an optimum value of the network structure based on the relational data (structure/error relational data) between the network structure and the input/output error of the normal data and the input/output error of the pseudo abnormal data. For example, the inference unit 18 specifies, as the optimum value, a network structure in which the difference between the input/output error of the normal data and the input/output error of the pseudo abnormal data takes a maximum value. Further, the inference unit 18 may specify, as the optimum value, a network structure that satisfies other condition such as a calculation cost among the network structures included in the recommended range. The output control unit 16 may display the optimum value on the display device 5. The display form is not particularly limited, and the numerical value of the network structure corresponding to the optimum may be simply displayed, or the optimum value may also be displayed to be superimposed on a graph representing the relation between the number of bottleneck nodes and the error average or a graph representing the relation between the number of bottleneck nodes and the error average difference, similarly to the recommended range. Further, the optimum value may be displayed together with the recommended range. Note that the optimum value may be selected from the network structure trained in step S601 or step S1301, or an untrained network structure may be selected.

In the above embodiment, the model training unit 12 comprehensively trains autoencoders of a plurality of network structures over a relatively wide range at one time in step S601 or S1301. However, the model training unit 12 may hierarchically trains autoencoders of a plurality of network structures over a wide range. Hereinafter, this embodiment will be described following the example of FIG. 6.

First, in step S601, the model training unit 12 trains autoencoders of a small number of network structures discretely set over a wide range. For example, in the case of the example of FIG. 10 or 11, training is performed for the autoencoders of the number of bottleneck nodes of five of $10^0$, $10^1$, $10^2$, $10^3$, and $10^4$. Then, steps S602 to S605 are executed, and a graph representing a relation between each of the number of bottleneck nodes of five and the input/output error is displayed on the display device 5. The user observes the graph and designates a range of the number of bottleneck nodes to be examined in detail via the input device 3. The model training unit 12 trains autoencoders of a plurality of network structures discretely set over the designated range. For example, in a case where a range of $10^1$ to $10^2$ is designated, training is performed for autoencoders of the number of bottleneck nodes of five of 10, 25, 50, 75, and 100. Then, steps S602 to S605 are executed, and a graph representing a relation between each of the number of bottleneck nodes of five and the input/output error is displayed on the display device 5. As a result, it is possible to examine the optimum number of bottleneck nodes in detail for the designated range. By performing training hierarchically as described above, the number of autoencoders to be trained can be reduced, and an optimum network structure can be efficiently searched.

Modification

In the above embodiment, data generated by performing data augmentation on normal data has been described as a specific example of pseudo abnormal data. The pseudo abnormal data according to the modification may be data of another domain different from the normal data. Hereinafter, the modification will be described following the example of FIG. 6.

First, in step S601, the model training unit 12 trains a plurality of autoencoders having different network structures based on the normal data. It is assumed that the normal data is image data in which numerals have been drawn as illustrated in FIG. 4 and the like. In step S602, the pseudo abnormal data acquisition unit 13 acquires image data of a domain different from that of the normal data from the storage device 2, an external device, or the like. In the case of the image data, the domain means a drawing target, a photographing condition, an image parameter, and the like. For example, it is assumed that the pseudo abnormal data is image data in which clothes, shoes, and the like have been drawn. Thereafter, similarly to the above embodiment, steps S603 to S605 are performed, and a graph or the like representing the relation between the network structure and the input/output error is displayed on the display device 5.

At this time, the output control unit 16 may output a list of output data of each of the plurality of autoencoders when the pseudo abnormal data is input for each network structure. This list is referred to as an output data list. The output data list will be described. Note that it is assumed that the network structure is, for example, the number of bottleneck nodes.

Figure 16:
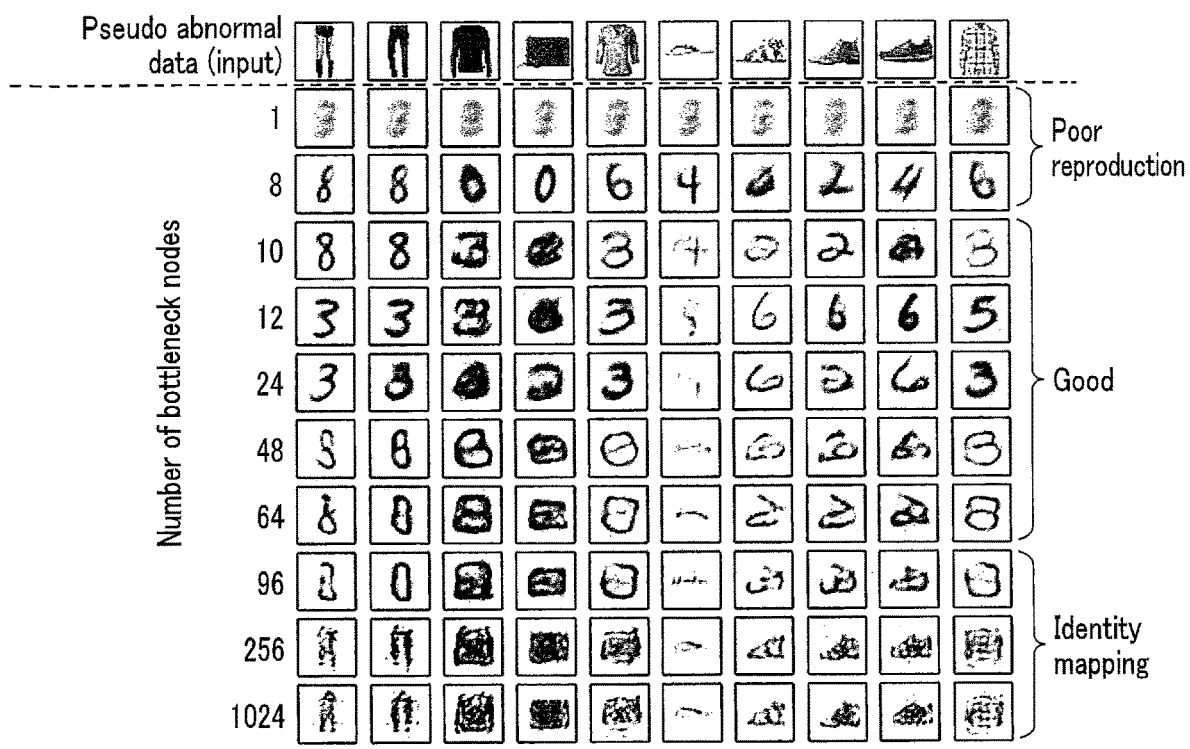
FIG. 16 is a diagram illustrating an example of an output data list.

FIG. 16 is a diagram illustrating an example of an output data list 161. As illustrated in FIG. 16, the output data list 161 arranges output image data of each of the plurality of autoencoders for each number of bottleneck nodes. In other words, the output data list 161 represents a change in the output image data of each of the plurality of autoencoders accompanying a change in the number of bottleneck nodes. In the uppermost row, image data in which 10 types of clothes or shoes have been drawn is arranged as input image data (pseudo abnormal data) to the autoencoder. Output image data from the autoencoder of each number of bottleneck nodes at the time of inputting each piece of pseudo abnormal data is arranged along a vertical axis.

The output data list illustrated in FIG. 16 is displayed on the display device 5, for example. The user can visually grasp a change in the output image data accompanying a change in the number of bottleneck nodes by referring to the output data list 161. For example, generally, it is visually understood that, when the number of bottleneck nodes is 1, the output image data does not reproduce even the normal data and the abnormality detection accuracy is poor reproduction, when the number of bottleneck nodes is in a range from 10 to 96, the output image data does not reproduce the pseudo abnormal data and the abnormality detection accuracy is relatively good, and when the number of bottleneck nodes is in a range from 256 to 1024, the output image data reproduces the pseudo abnormal data and identity mapping occurs.

In the above example, when data in another domain is used as the pseudo abnormal data, the output data list is output, but the present embodiment is not limited thereto. The output data list may be output even when data obtained by performing data augmentation on the normal data is used as the pseudo abnormal data. Further, the output data list may be not only displayed on the display device 5 but also stored in the storage device 2 or may be displayed on an external device via the communication device 4.

In the above example, the case where the network structure is the width or depth of the bottleneck layer has been described as an example, but the present embodiment is not limited thereto. The network structure may be a combination of the width and the depth of the bottleneck layer.

In this way, it is possible to support creation of an autoencoder having high abnormality detection performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
   a processing circuit configured to
      calculate a first input/output error related to normal data and a second input/output error related to pseudo abnormal data different from the normal data, for each autoencoder of a plurality of autoencoders, each autoencoder having a different network structure, wherein the normal data is data output by a factory machine or an inspection device of the factory machine when the factory device normally operates, and the pseudo abnormal data is data output by the factory machine or the inspection device when the factory device abnormally operates, and for each autoencoder, output relational data indicating a relation between the network structure of the autoencoder and the first input/output error and the second input/output error, wherein the processing circuit is further configured to calculate first output data by applying the normal data to each of the plurality of autoencoders, and calculate the first input/output error based on the first output data and the normal data; and calculate second output data by applying the pseudo abnormal data to each of the plurality of autoencoders, and calculate the second input/output error based on the second output data and the normal data.

2. The information processing apparatus according to claim 1, wherein the processing circuit is further configured to train the autoencoders based on the normal data.

3. The information processing apparatus according to claim 1, wherein each autoencoder is different from each other in a width and/or a position of a bottleneck layer as the network structure.

4. The information processing apparatus according to claim 1, wherein the processing circuit is further configured to infer, for each autoencoder, a recommended range or an optimum value of the network structure of the autoencoder based on the relational data.

5. The information processing apparatus according to claim 4, wherein the processing circuit is further configured to infer, for each autoencoder, the recommended range or the optimum value based on at least one of a difference between the first input/output error and the second input/output error, and a change in the first input/output error, the second input/output error, and/or the difference accompanying a change in the network structure of the autoencoder.

6. The information processing apparatus according to claim 4, wherein the processing circuit is further configured to display the recommended range or the optimum value in the relational data on a display device.

7. The information processing apparatus according to claim wherein the processing circuit is further configured to perform data augmentation on the normal data to generate the pseudo abnormal data.

8. The information processing apparatus according to claim 7, wherein the processing circuit is further configured to perform horizontal movement, parallel movement, inversion, and/or rotation on the normal data as the data augmentation.

9. The information processing apparatus according to claim 1, wherein the pseudo abnormal data is data in a domain different from a domain of the normal data.

10. The information processing apparatus according to claim 1, wherein the processing circuit is further configured to output, as the relational data for each autoencoder, a graph representing at least one of a relation between the network structure of the autoencoder and the first input/output error, a relation between the network structure of the autoencoder and the second input/output error, and a relation between the network structure of the autoencoder and a difference between the first input/output error and the second input/output error.

11. The information processing apparatus according to claim 1, wherein the processing circuit is further configured to output, for each autoencoder, a list of output data of the autoencoder when the pseudo abnormal data is input for the network structure of the autoencoder.

12. An information processing method, comprising:

calculating a first input/output error related to normal data and a second input/output error related to pseudo abnormal data different from the normal data, for each of a plurality of autoencoders, each autoencoder having a different network structure, wherein the normal data is data output by a factory machine or an inspection device of the factory machine when the factory device normally operates, and the pseudo abnormal data is data output by the factory machine or the inspection device when the factory device abnormally operates; and for each autoencoder, outputting a relation between the network structure of the autoencoder and the first input/output error and the second input/output error, wherein the method further comprises calculating first output data by applying the normal data to each of the plurality of autoencoders, and calculating the first input/output error based on the first output data and the normal data; and calculating second output data by applying the pseudo abnormal data to each of the plurality of autoencoders, and calculating the second input/output error based on the second output data and the normal data.

13. A non-transitory computer-readable storage medium including computer executable instructions, wherein the instructions, when executed by a processor, cause the processor to perform a method comprising:

calculating a first input/output error related to normal data and a second input/output error related to pseudo abnormal data different from the normal data, for each autoencoder of a plurality of autoencoders, each autoencoder having a different network structure, wherein the normal data is data output by a factory machine or an inspection device of the factory machine when the factory device normally operates, and the pseudo abnormal data is data output by the factory machine or the inspection device when the factory device abnormally operates; and for each autoencoder, outputting a relation between the network structure of the autoencoder and the first input/output error and the second input/output error, wherein the method further comprises calculating first output data by applying the normal data to each of the plurality of autoencoders, and calculating the first input/output error based on the first output data and the normal data; and calculating second output data by applying the pseudo abnormal data to each of the plurality of autoencoders, and calculating the second input/output error based on the second output data and the normal data.

\* \* \* \* \*